Patented May 10, 1949

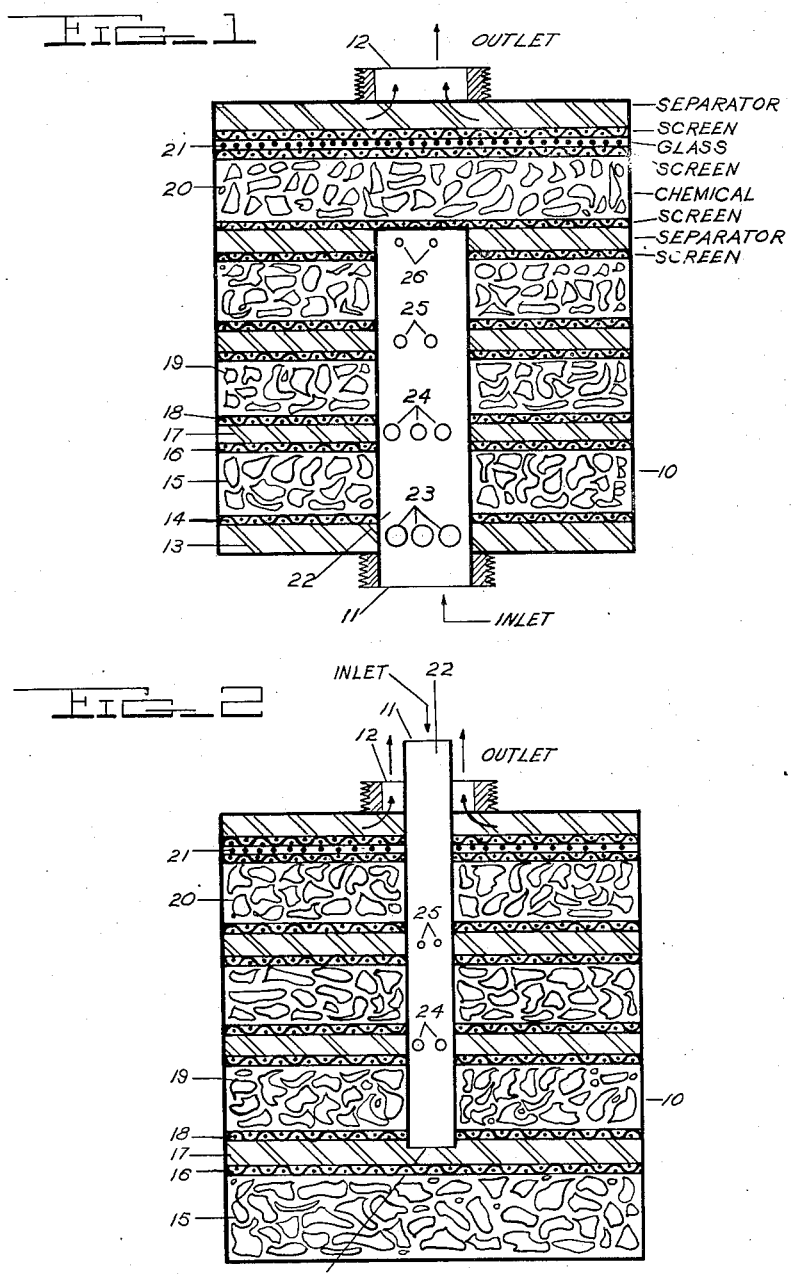

2,469,367

UNITED STATES PATENT OFFICE 2,469,367

CANISTER AND DISTRIBUTOR THEREFOR

David S. Burgess, Eugene A. Ramskill, and Roman R. Miller, Washington, D. C.

Application September 17, 1942, Serial No. 458,666

9 Claims. (Cl. 23—281)

(Granted under the act of March 3, 1883, as amended April 30, 1928; 370 O. G. 757)

This invention relates to canisters used in breathing apparatus for replenishment of oxygen and purification of air.

In protective breathing equipment wherein a limited supply of air is recirculated it is customary to purify the air by passage through various chemicals which remove carbon dioxide and replenish the oxygen consumed. In the case of portable equipment the chemicals are contained in a canister in a loose or porous condition and the air is passed through the canister before being returned for use. The chemicals, usually in lump form, are distributed through the canister in one or more layers with porous packing between in order to provide the greatest area of contact with least resistance to the air flow.

However, this arrangement is not effective, alone, in maintaining comfortable operation and uniform use of the chemicals in the case of oxygen liberating materials, such as potassium tetroxide and sodium peroxide, because the moisture in the breath tends to exhaust the first layer and then wet it sufficiently to reduce its porosity and render breathing difficult. Also, since some moisture is necessary to liberate oxygen from the alkali oxides, its removal by the first layer prevents release of most of the oxygen available in the succeeding layers.

This invention provides a distributing means for permitting the uniform consumption of chemicals in each layer and preventing obstruction to air flow caused by accumulation of excess moisture in any one layer. The invention also includes canisters embodying this distribution means.

The essence of the invention lies in the use of a conduit or distributor running transversely through one or more of the layers and containing openings which permit air to flow from the conduit to between the layers. In this way part of the air to be purified is by-passed around some of the layers and brought into contact with other layers before its moisture has been removed. In order to obtain uniform exhaustion of all of the layers it is necessary to regulate the size and number of openings from the conduit to the various layers, making the openings smaller or fewer (or both) as the number of by-passed layers increases.

In order that the invention may be clearly understood typical embodiments thereof are described with reference to the accompanying drawing, in which:

Fig. 1 is a cross-sectional view of a canister utilizing the distributor or conduit of this invention, and Fig. 2 shows a variation of the canister and distributor shown in Fig. 1.

Referring to Fig. 1, a can 10 is provided with an inlet opening 11 and an outlet opening 12. In the can 10 a separator 13 (which may conveniently be a wrinkled screen wire) and a wire screen 14 hold a layer of chemical material 15 (e. g. $Na_2O_2$ and $K_2O_4$) in place. Next to the layer 15 is a second wire screen 16, a separator 17 and a third screen 18 which separate the first layer 15 from a second layer of chemically reactive material 19. This construction is repeated for as many layers as are desired, four being shown in the drawing. After a final layer 20 a glass cloth 21 is interposed to trap any dust particles from the layers and to prevent them from passing along with the purified air. From the inlet 11 a distributor or conduit 22, connecting therewith, passes through the center of the can 10, and is sealed at the end. The conduit 22 has holes 23 opening into the space preceding the layer 15, that is into the separator 13, and holes 24, 25 and 26 opening into the space between succeeding layers, respectively. The holes 23, 24, 25 and 26 are of a size such that the total area of the holes 25 is greater than the total area of the holes 26, the total area of the holes 24 is greater than that of the holes 25 and the total area of the holes 23 is likewise greater than that of the holes 24. In this way the exhaustion of the chemical in the layers is maintained more nearly uniform. In addition, if the first layer (layer 15) should become plugged the canister can still be used with only a slight increase in resistance to air flow. The sizes of the holes 23, 24, 25 and 26 are not critical, but best results are obtained when the total area of holes between each pair of adjacent layers decreases proportionally as the number of by-passed layers increases.

Referring to Fig. 2, the inlet 11 and outlet 12 are concentric, thus permitting the canister to hang down from a single connecting tube. The conduit 22 extends through the can 10 and respective layers up to the first layer (counted in order of main air passage therethrough) or the layer 15, and it is open at the end, indicated as an opening 27 in the drawing. In this way the opening 27 serves as the first set of holes, corresponding to the holes 23 of Fig. 1. Another advantage of this construction over that of Fig. 1 is that condensed moisture from exhaled air may run down the conduit 22 and drip into the layer 15 without any possibility of increasing resistance to air flow or plugging up the canister, while at the same time it can react with the chemical to liberate oxygen.

The size of the canister is also a matter of choice, although obviously the larger it is the less resistance to air flow and longer life it has. For human use, however, it is impractical to design the canister smaller than about 4 inches in diameter and about 5 inches high because its life is too short to permit extended work.

Although the distributor described (and canister containing the same) is intended primarily for the regeneration of air, it may be used to obtain uniform exhaustion of gas reactive chemicals of any kind.

With respect to the distributor, it need not connect directly with either inlet or outlet opening, but it may remain centered in the canister, such as would be the case if it is designed not to pass through the end layers in the canister. However, for practical reasons it is better to have the distributor directly connected to one of the openings in the canister. In the drawing the distributor is shown connected only to the inlet opening, but it obviously may be reversed and connected only to the outlet opening.

Other variations will be apparent to those skilled in the art, and the invention should not be limited other than as by the appended claims.

The invention described herein may be manufactured and used by or for the Government of the United States of America for governmental purposes without the payment of any royalties thereon or therefor.

We claim:

1. In a canister having a pair of openings and a plurality of separated layers of gas reactive material enclosed thereby, a conduit for controlling distribution of gas between said openings through a plurality of said layers, said conduit extending transversely through a plurality of said layers and having at least one opening at the separations between said layers through which said conduit extends, said conduit openings decreasing in total area at each separation to cause the flow of gas between said conduit and said separations to decrease progressively as the number of by-passed layers increase.

2. In a canister having a pair of openings and a plurality of separated layers of gas reactive material enclosed thereby, a conduit for controlling distribution of gas from one of said openings through said layers to the other of said openings, said conduit extending from said one opening transversely through all of said layers except one and having at least one opening at the separations between said layers through which said conduit extends, said conduit openings decreasing in total area at each separation to cause the flow of gas from said conduit to between said layers to decrease progressively as the number of by-passed layers increases.

3. In a canister having a pair of openings and a plurality of separated layers of gas reactive material enclosed thereby, a conduit for controlling distribution of gas from one of said openings through said layers to the other of said openings, said conduit extending from said one opening transversely through all of said layers except one and having at least one opening at the separations between said layers through which said conduit extends, said conduit openings decreasing in total area at each separation to cause the flow of gas from said conduit to between said layers to decrease progressively as the number of by-passed layers increases.

4. A canister for air regeneration which comprises a container having a pair of openings, a plurality of spaced layers of material capable of liberating oxygen upon contact with moisture enclosed by said container, a conduit for controlling distribution of air between said conduit openings through said layers, said conduit extending transversely through a plurality of said layers and having a plurality of openings therein to admit air to the spaces between the layers through which said conduit extends, said conduit openings varying in area so that the air flow between said conduit and said spaces progressively decreases as the number of by-passed layers increases.

5. A canister for air regeneration which comprises a container having a pair of openings, a plurality of spaced layers of material capable of liberating oxygen upon contact with moisture enclosed by said container, a conduit for controlling distribution of air from one of said openings through said layers to the other of said openings, said conduit extending from said one container opening transversely through a plurality of said layers and having a plurality of openings therein to admit air to the spaces between the layers through which said conduit extends, said conduit openings proportioned in area so that the flow from said conduit to between said layers progressively decreases as the number of layers between said conduit openings and said other container opening decreases.

6. A canister for air regeneration which comprises a container having a pair of oppositely disposed openings, a plurality of spaced layers of material capable of liberating oxygen upon contact with moisture enclosed by said container, a conduit for controlling distribution of air from one of said openings through said layers to the other of said openings, said conduit extending transversely through a plurality of said layers and having a plurality of openings therein to admit air to the spaces between the layers through which said conduit extends, said conduit openings proportioned in area so that the air flow between said conduit and said spaces progressively decreases as the number of by-passed layers increase.

7. A canister for air regeneration which comprises a container having a pair of oppositely disposed openings, a plurality of spaced layers of material capable of liberating oxygen upon contact with moisture enclosed by said container, a conduit for controlling distribution of air from one of said openings through said layers to the other of said openings, said conduit extending from said one container opening transversely through a plurality of said layers and having a plurality of openings therein to admit air to the spaces between the layers through which said conduit extends, said conduit openings proportioned in area so that the air flow from said conduit to between said layers progressively decreases as the number of layers between said conduit openings and said other container opening decreases.

8. A canister for air regeneration which comprises a container having an opening therein, a plurality of spaced layers of material capable of liberating oxygen upon contact with moisture positioned in said container, a conduit extending through said opening in spaced relation therewith and into said container transversely through a plurality of said layers, said conduit having a plurality of openings at the spaces between said layers through which said conduit extends, said conduit openings of varying area to cause the flow of air between said conduit and said spaces to increase progressively as the number of layers between said conduit openings and said container opening increase.

9. A canister for air regeneration which comprises a container having an opening therein, a plurality of spaced layers of material capable of liberating oxygen upon contact with moisture positioned in said container, a conduit extending through said opening in spaced relation therewith and into said container transversely through said layers except one, said conduit having a plurality of openings at the spaces between said layers through which said conduit extends, said conduit openings of varying area to cause the flow of air between said conduit and said spaces to increase progressively as the number of layers between said conduit openings and said container opening increase.

DAVID S. BURGESS.
EUGENE A. RAMSKILL.
ROMAN R. MILLER.

REFERENCES CITED

The following references are of record in the file of this patent:

UNITED STATES PATENTS

| Number | Name | Date |
| --- | --- | --- |
| 1,011,482 | Pemberton | Dec. 12, 1911 |
| 1,111,055 | Carveth | Sept. 22, 1914 |
| 1,430,234 | Keithline | Sept. 26, 1922 |
| 1,585,113 | Robert | May 18, 1926 |
| 2,283,989 | Henry | May 26, 1942 |
| 2,315,208 | Kinnaird | Mar. 30, 1943 |

FOREIGN PATENTS

| Number | Country | Date |
| --- | --- | --- |
| 479,588 | Germany | July 19, 1929 |
| 695,185 | Germany | Aug. 19, 1940 |